(12) United States Patent
Handa

(10) Patent No.: US 8,327,010 B2
(45) Date of Patent: Dec. 4, 2012

(54) INFORMATION PROCESSING APPARATUS AND METHOD FOR CONTROLLING THE SAME

(75) Inventor: Masahiro Handa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 12/704,259

(22) Filed: Feb. 11, 2010

(65) Prior Publication Data

US 2010/0235498 A1 Sep. 16, 2010

(30) Foreign Application Priority Data

Mar. 16, 2009 (JP) ................................. 2009-063236

(51) Int. Cl.
*G06F 15/16* (2006.01)
(52) U.S. Cl. ......... 709/231; 709/203; 709/217; 709/232
(58) Field of Classification Search .................. 709/203, 709/217, 219, 223, 224
See application file for complete search history.

(56) References Cited

U.S. PATENT DOCUMENTS

| 7,523,214 B2 * | 4/2009 | Kikkawa et al. ............... 709/231 |
| 7,752,202 B2 * | 7/2010 | Kobori et al. .................. 707/736 |
| 7,809,742 B2 * | 10/2010 | Kagaya ........................... 707/758 |
| 2001/0010061 A1 * | 7/2001 | Matsumoto .................... 709/249 |
| 2004/0095392 A1 * | 5/2004 | Sato ............................... 345/772 |
| 2004/0172376 A1 | 9/2004 | Kobori et al. |
| 2005/0196145 A1 * | 9/2005 | Nakamura ....................... 386/94 |
| 2006/0161635 A1 * | 7/2006 | Lamkin et al. ................. 709/217 |
| 2007/0053514 A1 * | 3/2007 | Imai et al. ..................... 380/204 |
| 2007/0237136 A1 * | 10/2007 | Sako et al. ..................... 370/368 |
| 2007/0250530 A1 * | 10/2007 | Choi ............................... 707/102 |
| 2007/0255710 A1 * | 11/2007 | Kagaya ............................. 707/8 |
| 2009/0012985 A1 * | 1/2009 | Matsubara et al. ........... 707/101 |
| 2009/0077046 A1 * | 3/2009 | Narahara et al. .................. 707/3 |
| 2009/0119712 A1 * | 5/2009 | Kim et al. ....................... 725/40 |
| 2011/0016149 A1 * | 1/2011 | Sako et al. ..................... 707/769 |
| 2012/0023164 A1 * | 1/2012 | Matsunaga .................... 709/203 |

FOREIGN PATENT DOCUMENTS

| JP | 3823929 | 9/2006 |
| JP | 2007-317021 | 12/2007 |

* cited by examiner

*Primary Examiner* — Lashonda Jacobs
(74) *Attorney, Agent, or Firm* — Cowan, Liebowitz & Latman, P.C.

(57) ABSTRACT

In order to enable more of the contents managed by a content server to be provided, an information processing apparatus connected to a communication network includes: a managing unit that manages a content and attribute information; a detecting unit that detects an external processing apparatus connected to the communication network; an acquiring unit that acquires capability information, which indicates a capability that can be provided by the external processing apparatus; a generating unit that generates content list information containing a first list containing a content that is managed by the managing unit and that can be directly provided by the information processing apparatus, and a second list containing a content that can be provided by giving a processing request to the external processing apparatus; and a providing unit that provides the content list information to a client terminal.

9 Claims, 12 Drawing Sheets

FIG. 10

```
POST /_urn:schemas-upnp-org:service:ContentDirectory_control HTTP/1.1
  ..
SOAPACTION:"urn:schemas-upnp-org:service:ContentDirectory:1#Browse"

<?xml version="1.0" encoding="utf-8"?>
<s:Envelope xmlns:s="http://schemas.xmlsoap.org/soap/envelope" s:encodingStyle=...>
 <s:Body>
  <u:Browse xmlns:u="urn:schemas-upnp-org:service:ContentDirectory:1">
   <ObjectID >1</ObjectID >
   <BrowseFlag>BrowseDirectChildren</BrowseFlag >
    ..
  </u:Browse >
 </s:Body >
</s:Envelope >
```

F I G. 11

```
HTTP/1.1 200 OK
..
< ?xml version="1.0" encoding="utf-8"? >
< s:Envelope s:encodingStyle="http://schemas.xmlsoap.org/soap/encoding/" xmlns:s=... >
  < s:Body >
    < u:BrowseResponse xmlns:u="urn:schemas-upnp-org:service:ContentDirectory:1" >       200
      < Result >                                                                          210
      <DIDL-Lite xmlns="urn:schemas-upnp-org:metadata-1-0/DIDL-Lite/ "....">
      <item id="6" parentID="1" restricted="1">      211
      <dc:title>Sample1</dc:title>
        :
      <res protocolInfo="http-get:*:image/jpeg:*"colorDepth="24" resolution="640x480" size="80000" "...
                                     221     222           223              224              225
                                                                                          220
      </DIDL-Lite>:</Result >
    </u:BrowseResponse >
  </s:Body >
</s:Envelope >
```

FIG. 12

```
HTTP/1.1 200 OK
< ?xml version="1.0"encoding="utf-8"? >
< s:Envelope s:encodingStyle="http://schemas.xmlsoap.org/soap/encoding/" xmlns:s="…" >
    <s:Body >
        < u:BrowseResponse xmlns:u="urn:schemas-upnp-org:service:ContentDirectory:1" >          300
            <Result >                                                                          310
                <DIDL-Lite xmlns="urn:schemas-upnp-org:metadata-1-0/DIDL-Lite/"…">        320
                    <item id="6"parentID="1" restricted="1">
                    <dc:title>Sample1</dc:title>                               321
                    <res protocolInfo="http-get:*:image/jpeg/:*"colorDepth="24" resolution="640x480"   size="80000 "…
                    <res protocolInfo="http-get:*:image/bmp/:*"colorDepth="24" resolution="640x480"   size="80000 "…
                                                                                               322
                </DIDL-Lite></Result >
        </u:BrowseResponse >
    </s:Body >
</s:Envelope >
```

F I G. 13

```
HTTP/1.1 200 OK
..
< ?xml version="1.0" encoding="utf-8"? >
< s:Envelope s:encodingStyle="http://schemas.xmlsoap.org/soap/encoding/" xmlns:s=…… >
  <s:Body >
    < u:BrowseResponse xmlns:u="urn:schemas-upnp-org:service:ContentDirectory:1" >                    400
      <Result >                                                                                      410
        <DIDL-Lite xmlns="urn:schemas-upnp-org:metadata-1-0/DIDL-Lite/ "……">
          <item id="6"parentID="1" restricted="1">
            <dc:title>Sample2</dc:title>
            <res protocolInfo="rtsp-rtp-udp:*:PCMA:*" size="80000 "….          420
        </DIDL-Lite></Result >
    </u:BrowseResponse >
  </s:Body >
</s:Envelope >
```

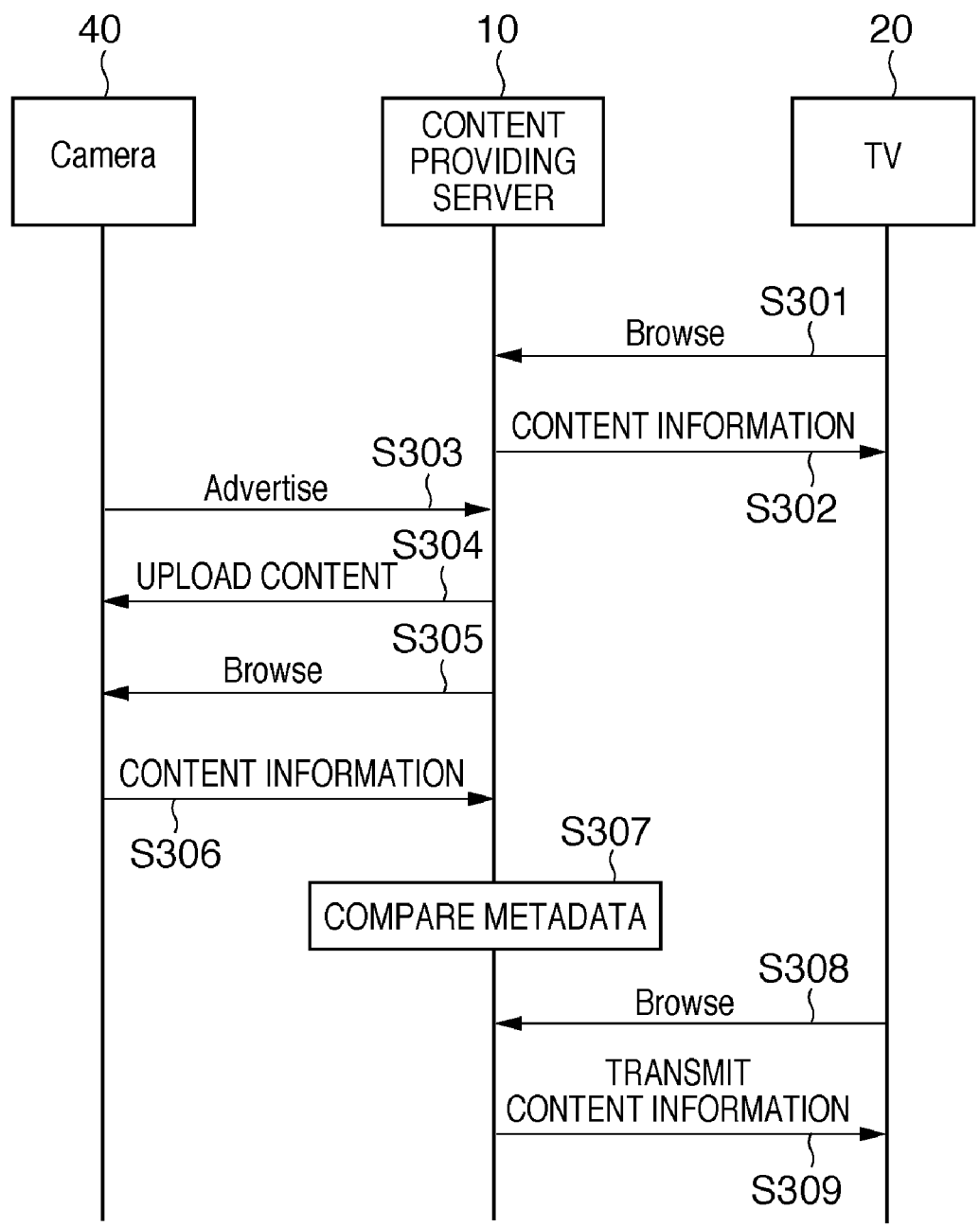

INFORMATION PROCESSING APPARATUS AND METHOD FOR CONTROLLING THE SAME

BACKGROUND OF THE INVENTION

1. Field of the Invention

The present invention relates to a technique for converting a content into a format that can be processed by a client apparatus and distributing the converted content.

2. Description of the Related Art

Recently, as communication networks become more widely used, it has become possible for household appliances, computers, and other peripherals to connect to networks at home, and to communicate multi-media data with each other. As a protocol for communication between these home communication apparatuses, communication standards, such as UPnP (Universal Plug and Play), DLNA (Digital Living Network Alliance), and the like, are formulated. A user downloads data from an apparatus that stores a content, such as a server or a digital recorder, onto an apparatus that performs playback of a content, such as a TV or a speaker. Through download, the user can watch or listen to multi-media contents, such as photos, images, audios, videos, and the like.

However, such contents are in formats having various configurations even if the types of the contents are the same. A playback apparatus that does not have playback functions corresponding to all of the formats may not be able to perform playback of the contents.

Accordingly, ordinarily used is a technique whereby an apparatus that provides a content can convert a content such that a playback apparatus can perform playback thereof, in consideration of the content playback capability of the playback apparatus. For example, Japanese Patent Laid-Open No. 2007-317021 and Japanese Patent No. 3823929 disclose techniques for converting a content using an external processing apparatus that can convert a content, even in the case where a content server cannot convert the content.

However, according to the technique disclosed in Japanese Patent Laid-Open No. 2007-317021, a content server and a conversion server that operates in conjunction therewith have to manage capability information of the other server. Furthermore, there may be cases where a content in a format in which a client can perform playback cannot be provided to the client. Furthermore, according to the technique disclosed in Japanese Patent No. 3823929, a content server has to be provided in advance with information on the playback capability of a client, and the client has to have a function of providing the information on the playback capability to the server.

SUMMARY OF THE INVENTION

The present invention provides a technique for enabling more of the contents managed by a content server to be provided, without adding a special function to a client that performs playback of a content.

According to one aspect of the present invention, an information processing apparatus connected to a communication network, comprises: a managing unit that manages a content and attribute information of the content; a detecting unit that detects an external processing apparatus connected to the communication network; an acquiring unit that acquires capability information, which indicates a capability that can be provided by the external processing apparatus detected by the detecting unit; a generating unit that generates content list information containing a first list containing a content that is managed by the managing unit and that can be directly provided by the information processing apparatus, and a second list containing a content that is managed by the managing unit and that can be provided by giving a processing request to the external processing apparatus; and a providing unit that provides the content list information to a client apparatus connected to the communication network.

According to another aspect of the present invention, a method for controlling an information processing apparatus connected to a communication network, comprises: a managing step of managing a content stored in a storage unit and attribute information of the content; a detecting step of detecting an external processing apparatus connected to the communication network; an acquiring step of acquiring capability information, which indicates a capability that can be provided by the external processing apparatus detected in the detecting step; a generating step of generating content list information containing a first list containing a content that is managed in the managing step and that can be directly provided by the information processing apparatus, and a second list containing a content that is managed in the managing step and that can be provided by giving a processing request to the external processing apparatus; and a providing step of providing the content list information to a client apparatus connected to the communication network.

According to the present invention, it is possible to provide a technique for enabling more of the contents managed by a content server to be provided to a client.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a diagram showing an example of a message given in the case where an acquisition request for a content list is given from the TV 20 to the content providing server 10.

FIG. 11 is a diagram showing an example of a content list message in the case where no external processing apparatus is present on the communication network 60.

FIG. 12 is a diagram showing an example of a content list message in the case where a camera 40 that can provide a content-converting function is found.

FIG. 13 is a diagram showing an example of a content list message in the case where a content distribution server 50 that can provide a content-distributing function is found.

FIG. 15 is a sequence diagram showing acquisition of content-providing capability by the content providing server 10 from the camera 40.

DESCRIPTION OF THE EMBODIMENTS

Hereinafter, preferred embodiments of the present invention will be described in detail with reference to the drawings. However, it should be noted that the following embodiments are to be taken as examples only; the scope of the present invention is not intended to be limited by the individual embodiments described hereinafter.

First Embodiment

Hereinafter, a first embodiment of an information processing apparatus according to the present invention will be described using, as an example, a content providing server in a content distribution system.

SUMMARY

A content providing server 10 acquires capability information, which indicates a capability that can be provided by a camera 40 and a content distribution server 50 connected to a communication network 60, from these apparatuses. Based on the acquired capability information, content list information, which indicates contents that can be provided, is generated and provided to a TV 20 and a PC 30, which are playback apparatuses (client apparatuses). The TV 20 and the PC 30 select a content that a client wants, based on the provided content list information, and transmit an acquisition request for the selected content to the content providing server 10.

System Configuration

Figure 1:
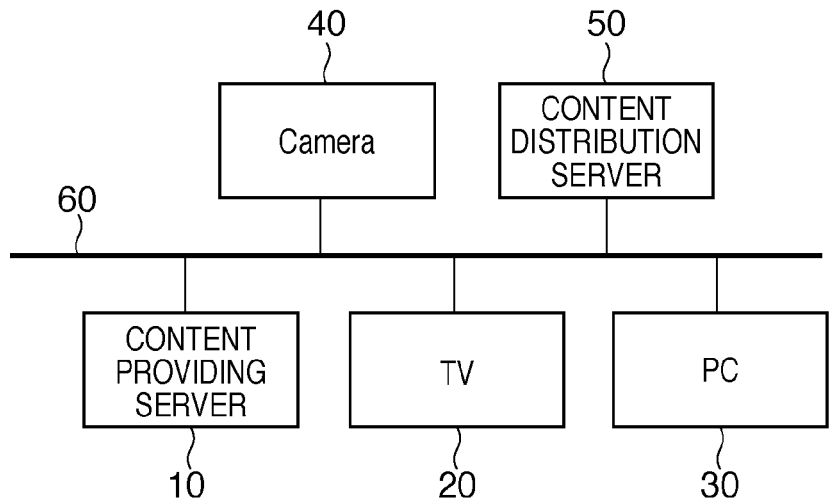
FIG. 1 is a diagram showing the overall configuration of a content distribution system according to a first embodiment.

FIG. 1 is a diagram showing the overall configuration of a content distribution system according to the first embodiment. In the content distribution system, the content providing server 10 that unifies management of contents, and the TV 20 and the PC 30, which are client apparatuses that perform playback of contents, are connected to each other via the communication network 60. Furthermore, the communication network 60 is connected to the camera 40 that has a content conversion processing capability and the content distribution server 50 that has a content distribution processing capability.

The content providing server 10 receives a request from various client apparatuses, and provides a content. Here, it is assumed that the content providing server 10 can distribute a content using HTTP (HyperText Transfer Protocol). Furthermore, the content providing server 10 manages contents (such as photos, images, audios, videos, and the like), and stores information corresponding to each content (information indicating a location, an attribute, a transfer method, a file name, and the like), as metadata (attribute information). Examples of the attribute of a content include data format, size, and the like. Examples of data information include various types of information, such as file name, date, and the like. Here, a content may be stored in a storage unit inside the content providing server 10, or may be stored in an external storage apparatus (not shown) connected to the communication network 60.

The TV 20 is a client apparatus that functions so as to perform playback and to display a content. Furthermore, the PC 30 is a client apparatus on which content playback software has been installed and that can perform playback of various contents.

The camera 40 is an apparatus that generates a still image or a moving image. Furthermore, the camera functions so as to perform a conversion processing on a content, such as a processing that converts the format of a content (e.g., converts a Raw image into a JPEG image), a processing that converts the image size of a content, a processing that converts the resolution, and the like. Moreover, the camera is configured so as to be able to provide the conversion function to each apparatus connected to the communication network 60. Here, a Raw image refers to data in a format specific to the camera 40.

The content distribution server 50 is a server that is configured so as to use a more preferable transfer protocol according to the type of a content. Examples of the transfer protocol include HTTP, FTP (File Transfer Protocol) suitable for highly reliable transfer, RTSP-RTP (Realtime Streaming Protocol-Realtime Transport Protocol) suitable for real-time transfer, and unique data transfer protocols. Furthermore, a client apparatus can specify the size of a content, the speed of transfer, and the like.

The communication network 60 transfers data between apparatuses connected to the communication network. For example, Ethernet (registered trademark), a wireless LAN, and the like can be used.

Here, it is assumed that each apparatus described above can advertise and detect apparatuses or services, and can provide and control services using UPnP and DLNA frameworks. More specifically, it is assumed that the following protocols used in UPnP and DLNA are provided.

SSDP (Simple Service Discovery Protocol) used to detect apparatuses or services

SOAP (Simple Object Access Protocol) used to exchange XML data

GENA (General Event Notification Architecture) used to give various types of notification between apparatuses Here, a configuration is also possible in which other frameworks and other protocols having similar functions are used.

Apparatus Configuration

Figure 14:
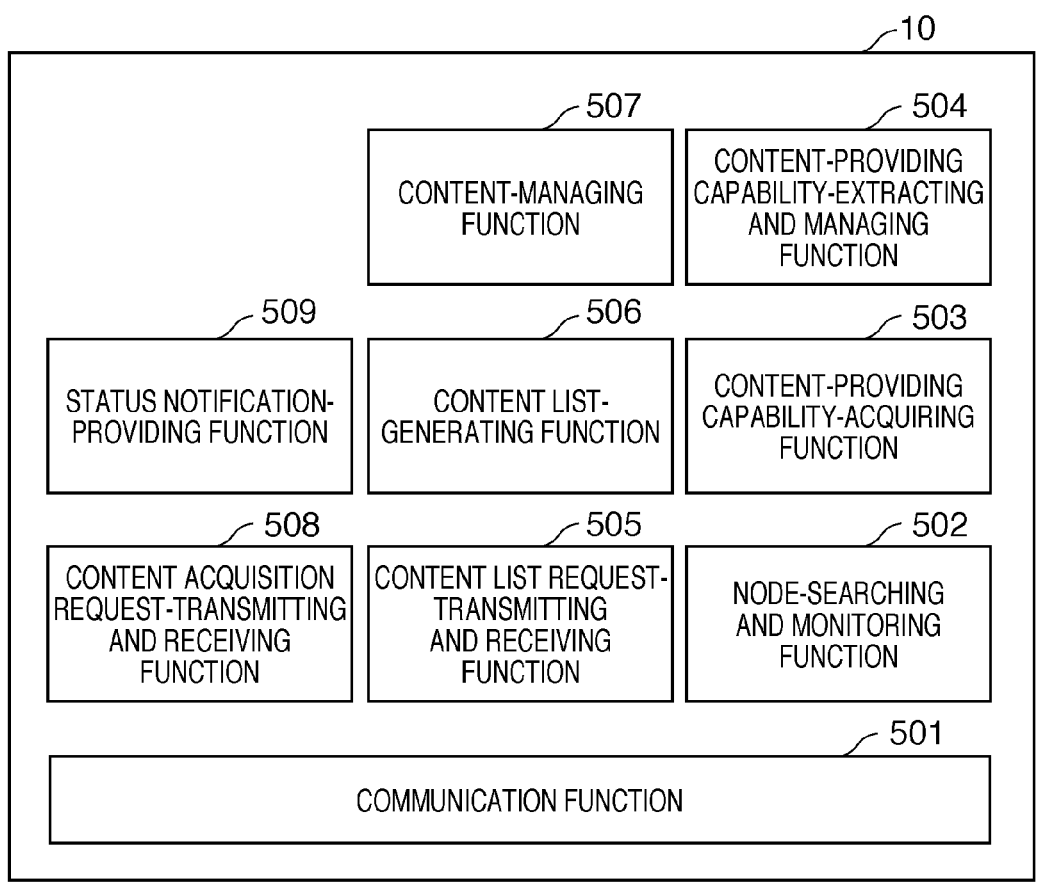
FIG. 14 is a diagram showing the internal configuration of the content providing server 10.

FIG. 14 is a diagram showing the internal configuration of the content providing server 10.

A communication function 501 is a module that communicates a message via the communication network 60. A node-searching and monitoring function 502 functions so as to search the communication network 60 using SSDP M-Search, via the communication function 501. Furthermore, this function is a module that functions so as to await an Advertise from the camera 40 via the communication function 501, and to monitor the alive status of the found camera 40 or the like.

A content-providing capability-acquiring function 503 is a module that acquires the information on a capability to provide a content, from an external processing apparatus, such as the found camera 40 or the like, via the communication function 501. A content-providing capability-extracting and managing function 504 functions so as to store information acquired by the content-providing capability-acquiring function 503. Furthermore, this function is a module that functions so as to compare the content-providing capability of the content providing server 10 and the content-providing capability in already stored information, and to store the difference therebetween.

A content list request-transmitting and receiving function 505 functions so as to receive a content list acquisition request from the TV 20 or the like, via the communication function 501. Furthermore, this function is a module that functions so as to send back a content list generated by a content list-generating function 506 (described later) and containing metadata, according to the content list acquisition request.

The content list-generating function 506 is a module that functions so as to generate a content list of contents managed by a content-managing function 507. More specifically, this function generates a content list containing metadata based on the content-providing capability stored by the content-providing capability-extracting and managing function 504. The content-managing function 507 is a module that functions so as to store a content itself, or to manage the location of a content.

A content acquisition request-transmitting and receiving function 508 functions so as to receive a content acquisition request from the TV 20 or the like via the communication function 501. Furthermore, this function is a module that performs a processing that provides a managed content according to the content acquisition request. A status notification-providing function 509 functions so as to receive a content update notification request from the TV 20 or the like via the communication function 501, and to store the received information on the TV 20. Furthermore, this function is a module that functions so as to transmit an update notification to the TV 20 from which the content update notification request has been received, in the case where the content is updated, or where the content-providing capability is updated.

System Operation

Figure 2:
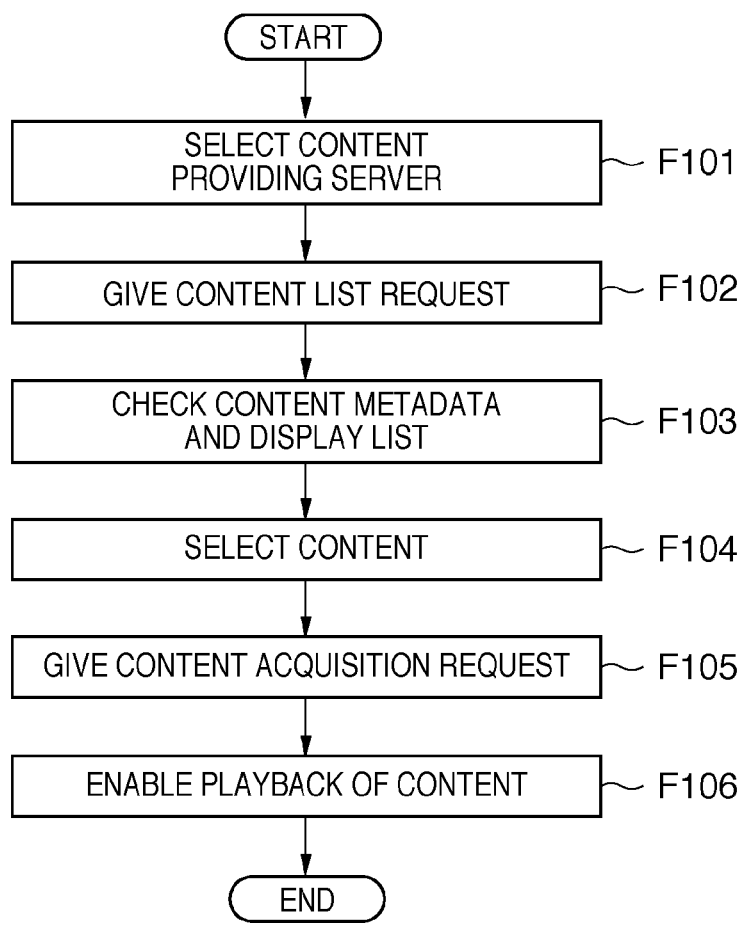
FIG. 2 is a flowchart showing a typical operation performed when watching or listening to a content in a UPnP/DLNA environment.

FIG. 2 is a flowchart showing a typical operation performed when watching or listening to a content in a UPnP/DLNA environment.

In step F101, a user operates the TV 20, for example, by remote control, and selects a content providing server 10 managing a content that the user wants to watch. Here, information on content providing servers 10 is distributed in advance to the TV 20 via an SSDP Advertise message distributed by multicast from the content providing servers 10. Alternately, the TV 20 finds the content providing server 10 by receiving a response from the content providing server 10 to an SSDP M-Search message transmitted by the TV 20.

In step F102, the TV 20 transmits a SOAP Browse_Action message to the content providing server 10, and acquires content list information stored in the content providing server 10. It is assumed that the content list information contains, as metadata, information indicating a location, an attribute, a transfer method, and other information, corresponding to each content.

In step F103, the TV 20 displays a list of contents that the TV 20 can perform playback thereof, based on the acquired content list information. Then, in step F104, selection of a content that the user wants to watch from among the contents in the displayed list is received from the user.

In step F105, the TV 20 gives the content providing server 10 an acquisition request for the content specified in the information received in step F104. Then, in step F106, the TV 20 acquires the content transmitted from the content providing server 10, and performs playback of the content.

According to the above-described procedure, the user can watch the contents managed by the content providing server 10, via the TV 20.

Usage of External Processing Apparatus Providing Content-Converting Function

In the case where a content that the user wants to watch is only in a format in which the TV 20 cannot perform playback of that content, the user cannot watch the content. Hereinafter, an example will be described in which a request to convert the format of a content is given to the camera 40, and the converted content is provided from the content providing server 10 to the TV 20.

Figure 3:
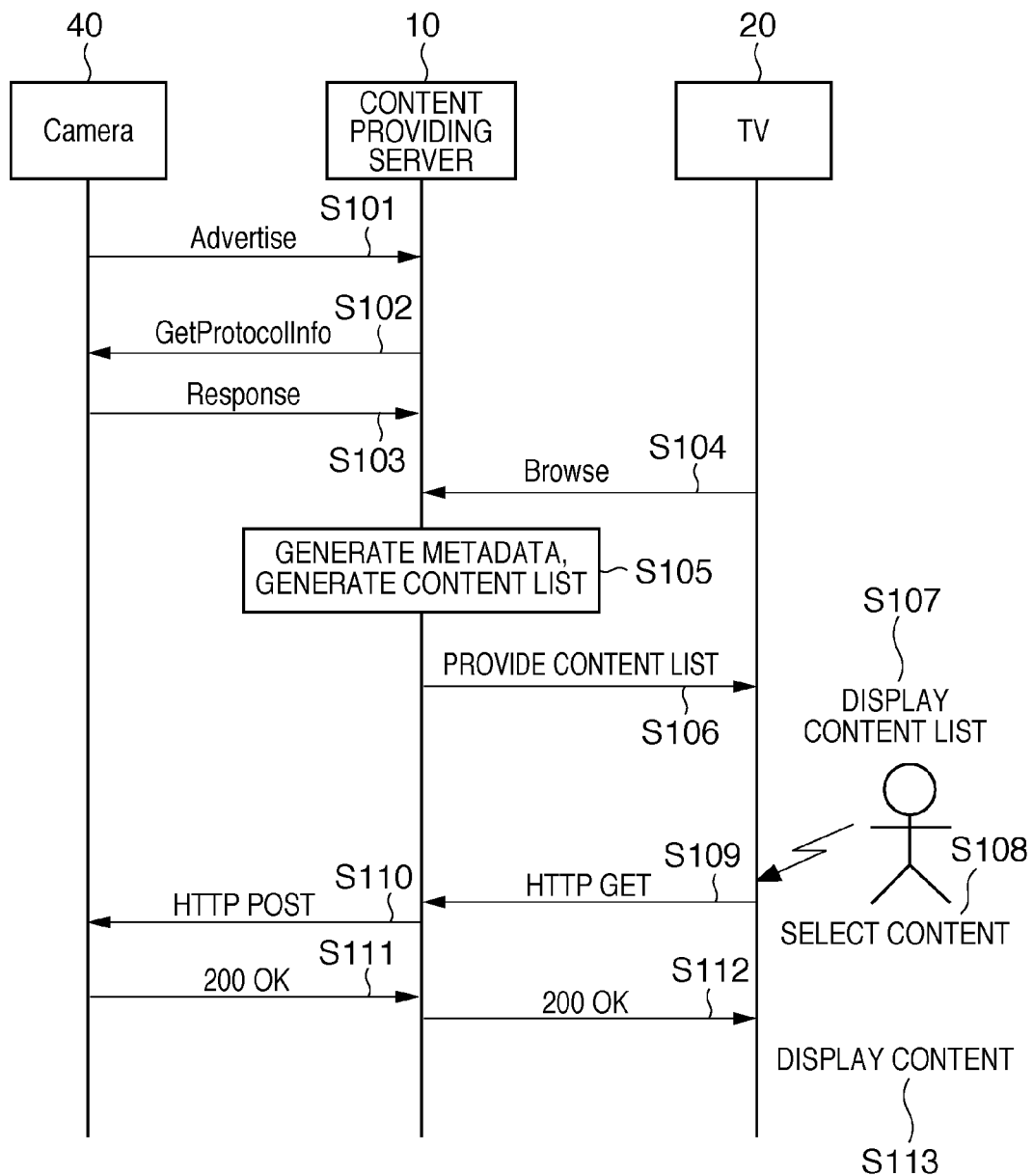
FIG. 3 is a sequence diagram showing an example in which a request to convert the format of a content is given to a camera 40.

FIG. 3 is a sequence diagram showing an example in which a request to convert the format of a content is given to the camera 40, and the content is provided to the TV 20. Here, it is assumed that the content providing server 10 stores a Raw image content. Furthermore, it is assumed that the TV 20 can perform playback of only JPEG images. Furthermore, it is assumed that the camera 40 can provide a capability to convert a Raw image into a JPEG image to another apparatus.

In step S101, the content providing server 10 receives an SSDP Advertise message from the camera 40. Alternatively, the content providing server can find the camera 40 on the communication network 60, by receiving a response to an SSDP M-Search message. Moreover, the content providing server acquires a device description that describes the device configuration of the camera 40 and a service description that describes the service type of the camera 40, from the camera 40. Accordingly, the content providing server 10 can obtain information on the device configuration and the service type of the camera 40, and SOAP Action provided by the camera 40.

In step S102, the content providing server 10 inquires about the content-providing capability to the found camera 40. In this example, the case will be described in which the camera 40 supports UPnP ConnectionManager:1 service. More specifically, a GetProtocolInfo message is transmitted to the camera 40 according to SOAP. Examples of the content-providing capability include the attributes of contents that can be provided (formats, for example), methods for transferring contents (transfer protocols, for example), and the like.

In step S103, the content providing server 10 receives a response from the camera 40, and, thus, obtains information on the content-providing capability supported by the camera 40.

In step S104, the content providing server 10 receives a SOAP Browse_Request message from the TV 20. Then, in step S105, the content providing server 10 generates metadata of contents, based on contents that can be directly provided by the content providing server with its content-providing capability, and the content-providing capability of the camera 40 acquired in step S103. Furthermore, a content list containing the metadata is generated. Here, a content list containing a Raw image list (first list) and a JPEG image list (second list) is generated.

In step S106, the content providing server 10 provides the TV 20 with the content list containing the Raw image list and the JPEG image list. Here, in the case where the camera 40 has left the communication network 60, the content providing server 10 provides the TV 20 with a content list in which metadata contains Raw images. The content list of JPEG images is deleted.

In step S107, the TV 20 displays a list of contents in formats in which the TV can perform playback, based on the received content list. For example, the TV displays only a list of contents in JPEG format, without displaying contents in Raw format. Here, in the case where a content list in which metadata contains only Raw images is received, no information is displayed on the content list of the TV 20.

In step S108, selection of a content from among the contents in the displayed list is received from the user. Then, in step S109, the TV 20 transmits an acquisition request for the selected content, to the content providing server 10, according to the specification of a transfer protocol contained in the metadata. Here, an HTTP GET message is transmitted.

In step S110, the content providing server 10 that has received the acquisition request for the content determines the contents of this request. Furthermore, it is determined based on the capability information acquired from the TV 20 whether or not the TV 20 can display the requested content. In the case where the requested content is a Raw image, the TV 20 cannot display the Raw image. Thus, the Raw image corresponding to the requested content is transmitted to the camera 40, and a request to convert the content is given. Then, in step S111, the camera 40 converts the content from the received Raw image into a JPEG image, and transmits the JPEG image to the content providing server 10.

In step S112, the content providing server 10 transmits the converted content (JPEG image) to the TV 20. Then, in step S113, the TV 20 displays the content received from the content providing server 10. Here, in the case where the content requested in step S109 is a JPEG image, the content providing server 10 transmits the requested JPEG image content to the TV 20.

In this manner, the content providing server 10 can provide a content that the user wants, in a format in which the TV 20 can perform playback of that content.

In the description above, an example is given in which the camera 40 converts the format of a content, but the camera may convert the size or the resolution of a content (image).

Usage of External Processing Apparatus Providing Content-Distributing Function

In the case where a content that the user wants to watch is provided only in a transfer protocol that cannot be used by the TV 20, the user cannot watch the content. Hereinafter, a configuration will be described in which a content is provided to the TV 20 by giving a request to transfer (distribute) the content to the camera 40.

Figure 4:
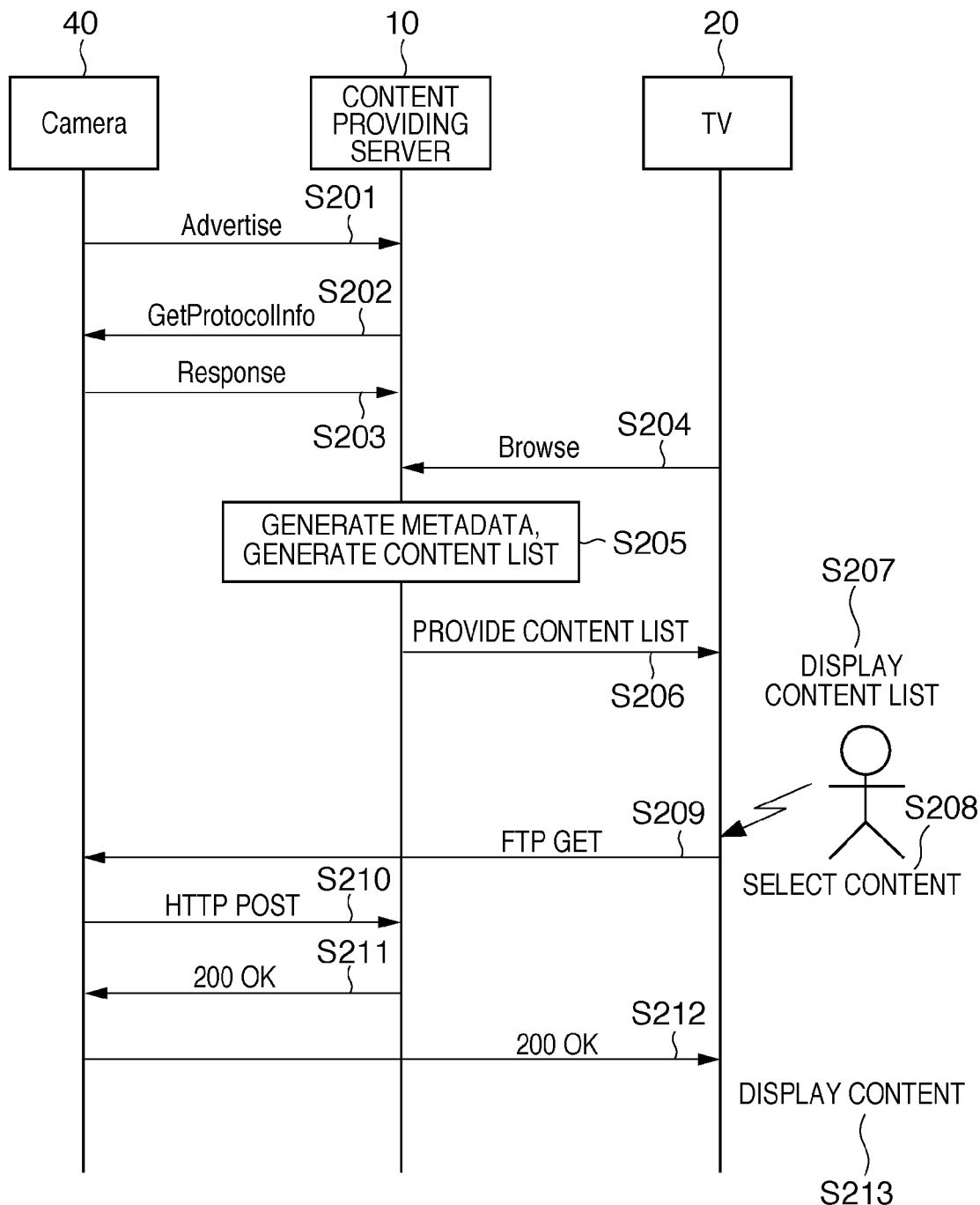
FIG. 4 is a sequence diagram showing an example in which a request to distribute a content is given to the camera 40, and the content is provided to a TV 20.

FIG. 4 is a sequence diagram showing an example in which a request to distribute a content is given to the camera 40, and the content is provided to the TV 20. Here, it is assumed that the content providing server 10 stores a JPEG image content. Furthermore, it is assumed that the TV 20 can acquire a content according to FTP and perform playback of only JPEG images. Moreover, it is assumed that the camera 40 functions so as to provide a content according to FTP.

Steps S201 to S204 are similar to steps S101 to S104 described above.

In step S205, the content providing server 10 generates metadata of contents, based on its own content-providing capability, and the content-providing capability of the camera 40 acquired in step S203. Furthermore, a content list containing the metadata is generated. Here, a content list in which metadata contains transfer condition indicating HTTP transfer and/or FTP transfer is generated.

In step S206, the content providing server 10 provides the TV 20 with a content list in which metadata contains HTTP transfer and/or FTP transfer. Here, in the case where the camera 40 has left the communication network 60, the content providing server 10 provides the TV 20 with a content list in which metadata contains HTTP transfer.

In step S207, the TV 20 displays a list of contents according to transfer protocols that can be used by the TV, based on the received content list. For example, the TV displays only a list of contents according to FTP transfer, without displaying contents according to HTTP transfer. Here, in the case where a content list in which metadata contains only HTTP transfer is received, no information is displayed on the content list of the TV 20.

In step S208, selection of a content from among the contents in the displayed list is received from the user. Then, in step S209, the TV 20 transmits an acquisition request for the selected content to the camera 40 according to a transfer protocol contained in the metadata (FTP, in this example).

In step S210, the camera 40 that has received the acquisition request for the content transmits the acquisition request for the requested content to the content providing server 10. Then, in step S211, the camera 40 receives data of the content (JPEG image) from the content providing server 10. Subsequently, in step S212, the camera 40 transmits the content to the TV 20. Lastly, in step S213, the TV 20 displays the received content.

In this manner, the content providing server 10 can provide a content that the user wants, according to a transfer protocol with which the TV 20 can perform playback of that content, by giving a transfer request to the camera 40.

Detection of External Processing Apparatus on Communication Network

Hereinafter, a processing in which the content providing server 10 detects the camera 40 and the content distribution server 50 connected to the communication network 60, and a processing performed at the time of detection will be described.

Figure 5:
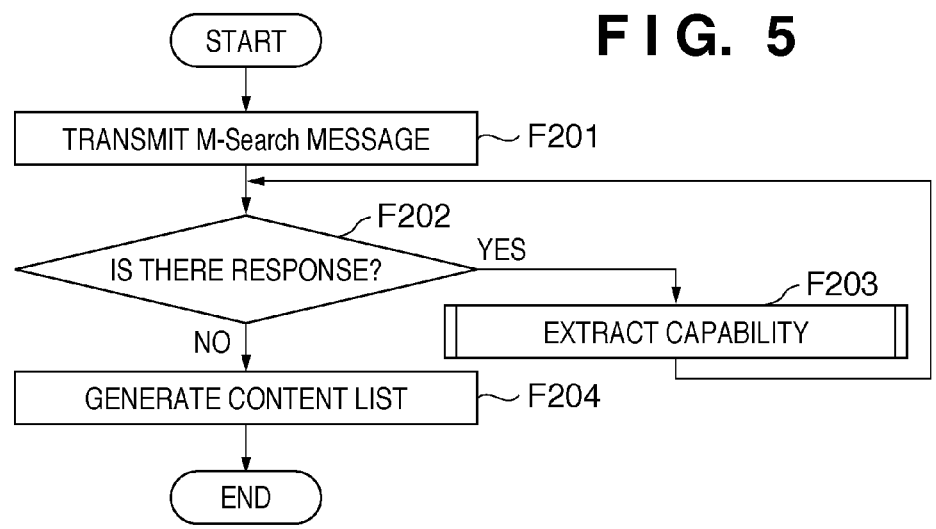
FIG. 5 is a flowchart in which a content providing server 10 searches for an external processing apparatus on a communication network 60.

FIG. 5 is a flowchart in which the content providing server 10 searches for an external processing apparatus on the communication network 60.

In step F201, the content providing server 10 transmits an SSDP M-Search message by multicast. Then, for a given period of time, the content providing server awaits a response to the M-Search message from an external processing apparatus (the camera 40, for example) connected to the communication network 60 (F202).

In the case where a response is received from a new apparatus within the given period of time, a content-providing capability extraction processing (described later) is performed (F203). On the other hand, in the case where the given period of time has elapsed, the content providing server 10 generates a content list containing metadata, based on content attributes and transfer methods that can be provided with the providing capability of the content providing server 10 and the providing capability of the newly detected external processing apparatus (F204).

Figure 6:
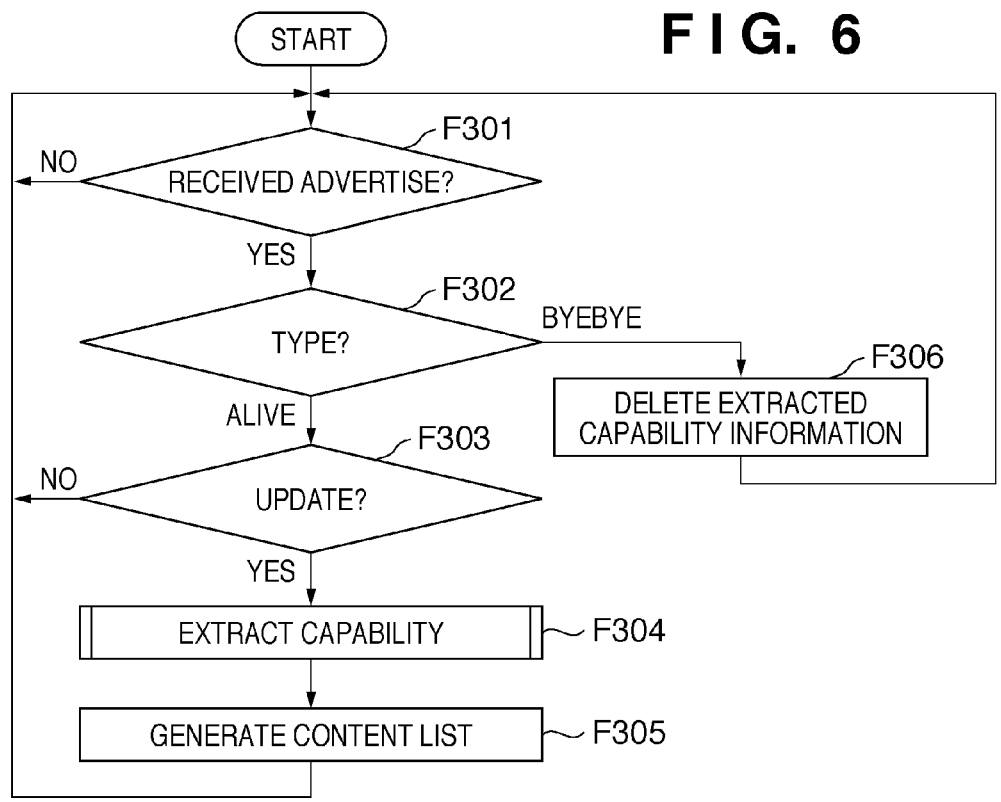
FIG. 6 is a flowchart in which the content providing server 10 detects an external processing apparatus connected to the communication network 60.

FIG. 6 is a flowchart in which the content providing server 10 detects an external processing apparatus connected to the communication network 60, based on an Advertise from the external processing apparatus.

In step F301, the content providing server 10 awaits an SSDP Advertise message from an external processing apparatus.

In step F302, upon receiving the Advertise message, the content providing server 10 confirms the contents of the message. More specifically, the content providing server determines whether the message is an "Alive" message indicating that the apparatus is continuously connected to the communication network 60, or a "BYEBYE" message indicating that the apparatus is leaving the communication network 60.

In the case of a BYEBYE message, the content-providing capability information of that external processing apparatus is deleted (F306). Conversely, in the case of an Alive message, it is determined whether the message indicates that an apparatus is newly connected or that the alive time has been updated (F303). In a case other than where the alive time is updated, a content-providing capability extraction processing of an external processing apparatus (described later) is performed.

In step F305, the content providing server 10 generates a content list containing metadata, based on content attributes and transfer methods that can be provided with the providing capability of the content providing server 10 and the external processing apparatus detected on the communication network 60.

Content-Providing Capability Extraction Processing Performed by the Content Providing Server 10

Figure 7:
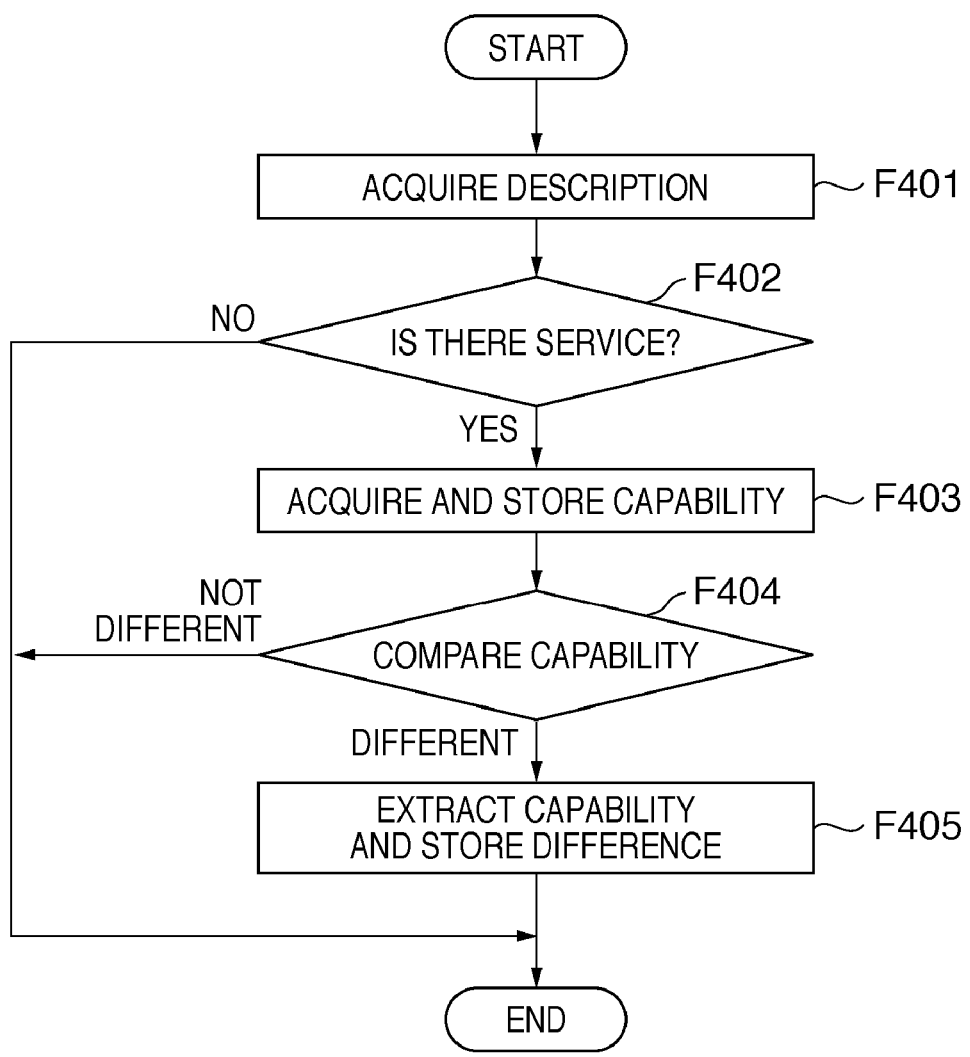
FIG. 7 is a flowchart in which the content providing server 10 extracts content-providing capability of a detected external processing apparatus.

FIG. 7 is a flowchart in which the content providing server 10 extracts content-providing capability of a detected external processing apparatus.

In step F401, upon detecting an external processing apparatus, the content providing server 10 acquires a device description and a service description disclosed by the external processing apparatus.

In step F402, referring to the acquired descriptions, the content providing server 10 checks whether or not the external processing apparatus has a content-providing service.

In step F403, in the case where the external processing apparatus has a content-providing service, information on the content-providing capability is acquired, and the acquired information on the capability and the external processing apparatus is stored. As an acquiring method, GetProtocolInfo Action provided by ConnectionManagerService may be used. With GetProtocolInfo, information on protocols (e.g., HTTP, FTP, and the like) that can be used and content formats that can be provided (e.g., Image/JPEG, BMP, and the like) is obtained. Furthermore, services provided by AVTransferService and RenderingControlService can be acquired from the descriptions.

In step F404, the content providing server 10 compares the content-providing capability of the external processing apparatus and the content-providing capability of the content providing server 10, and confirms whether or not there is a difference therebetween. Moreover, in the case where there are two or more external processing apparatuses, the confirmation is performed for each apparatus.

In step F405, in the case where there is a difference, the content providing server 10 stores that item as difference information.

Figure 8:
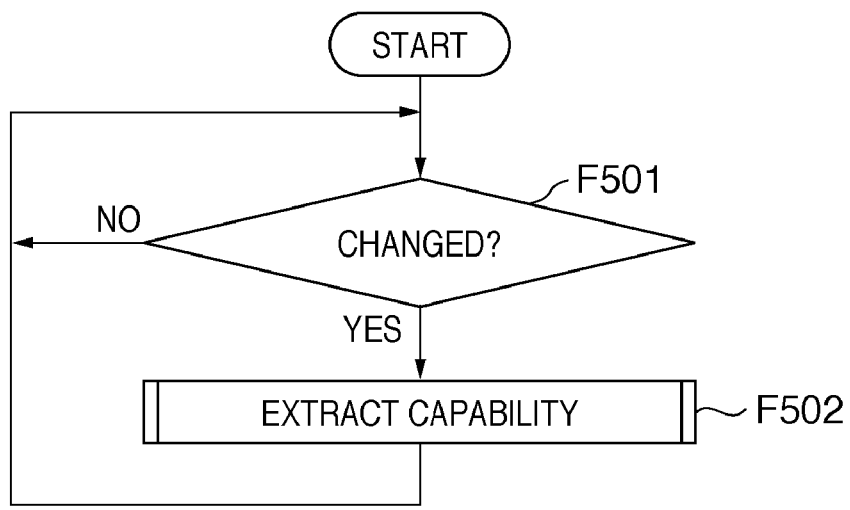
FIG. 8 is a flowchart in the case where the content-providing capability of the detected external processing apparatus has changed.

FIG. 8 is a flowchart in the case where the content-providing capability of the detected external processing apparatus has changed.

The content providing server 10 regularly or irregularly acquires a device description and a service description from the external processing apparatus. Then, for example, in the case where it is determined that the external processing apparatus has left the communication network 60, the content-providing capability information is updated (F501 and F502).

Figure 9:
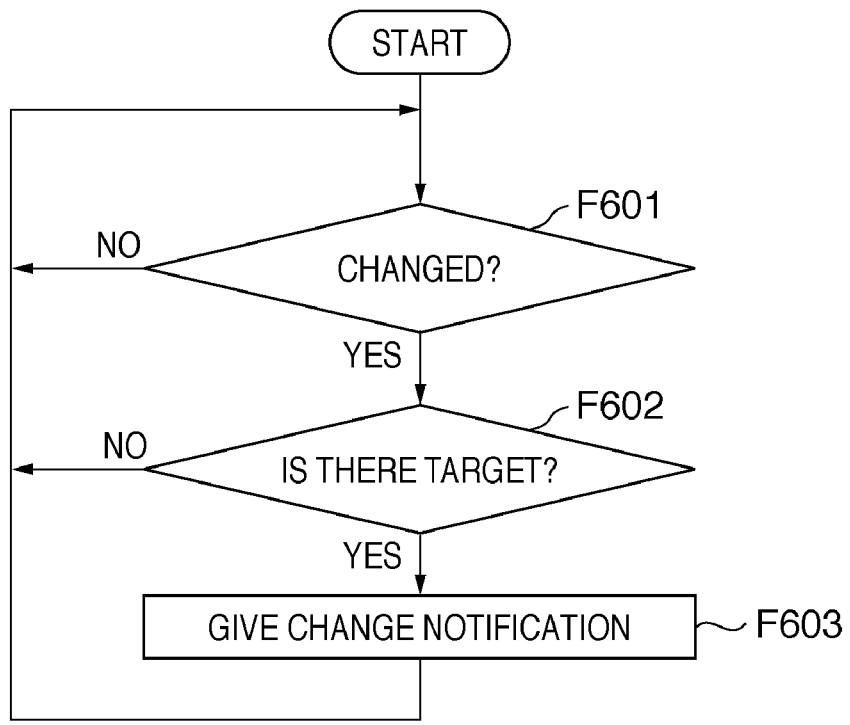
FIG. 9 is a flowchart in which updated content list information is provided to the playback apparatus.

FIG. 9 is a flowchart in which updated content list information is provided to the playback apparatus.

In step F601, the content providing server 10 detects a change in the content-providing capability information. In the case where there is a change, it is checked whether or not there is a content playback apparatus that is to be notified of the update (F602). In the case where there is a content playback apparatus that is to be notified of the update, update notification of the content-providing capability information is performed (F603). More specifically, the apparatus that is to be notified of the update is registered, as a result of a GENA SUBSCRIBE_Request message being received from the TV 20 or the like. In the case where update of the content-providing capability information is detected, a GENA NOTIFY message is transmitted to the registered apparatus that is to be notified of the update.

Example of Message Relating to Acquisition Request for Content List

FIG. 10 is a diagram showing an example of a message given in the case where an acquisition request for a content list is given from the TV 20 to the content providing server 10. Furthermore, FIG. 11 shows an example of a content list message in the case where no external processing apparatus is present on the communication network 60.

Content list information 200 contains a plurality of pieces of content information 210. The content information 210 contains, for example, a content title 211, and the like. In addition to this, the content information may contain information, such as a name of creator ("Creator"), date of creation ("Date"), and the like. Moreover, the content information 210 contains a plurality of pieces of resource information (res. information) 220 containing content attributes and transfer methods that can be provided.

The res. information 220 contains information on a transfer unit 221, content type information ("Mime-Type") 222, color depth information ("colorDepth") 223, resolution information ("resolution") 224, and file size information ("size") 225. Here, the res. information 220 may further contain address information indicating a location at which a content is stored, content duration information, protection information, sample rate information, and the like.

FIG. 12 is a diagram showing an example of a content list message in the case where the camera 40 that can provide a content-converting function is found. Here, an example is shown in which a converting function from a JPEG image into a BMP image is provided as the content-converting function.

Structures 300, 310, and 320 contained in the message are the same as the structures 200, 210, and 220 described in FIG. 11. In FIG. 11, a content list containing only JPEG images is sent back. However, in this example, the content-converting function of the camera 40 can be used, and, thus, a content list containing JPEG images and BMP images is sent back. More specifically, metadata in which a message 320 contains not only a JPEG image 321 but also a BMP 322 is added.

FIG. 13 is a diagram showing an example of a content list message in the case where content distribution server 50 that can provide a content-distributing function is found. Here, an example is shown in which a transfer function according to RTSP-RTP is provided as the content-distributing function.

Structures 400, 410, and 420 in the message are the same as the structures 200, 210, and 220 described in FIG. 11. In FIG. 11, a list of contents transferred according to HTTP is sent back. However, in this example, the content-distributing function of the content distribution server 50 can be used, and, thus, a content list containing not only HTTP data but also RTSP-RTP data is sent back. More specifically, metadata in which a message 420 contains RTSP-RTP is added.

In the case where a moving image is distributed, it is preferable to use a protocol that performs stream distribution, instead of a protocol that transfers a content as a file, such as HTTP or FTP. In particular, with moving image transfer that uses real-time transfer-oriented RTSP-RTP, the user can more comfortably watch or listen to a content.

Another Example of Acquisition of Content-Providing Capability from External Processing Apparatus FIG. 15 is a sequence diagram showing acquisition of content-providing capability by the content providing server 10 from the camera 40.

In step S301, the content providing server 10 receives a SOAP ACTION Browse_Request message as a content list request from the TV 20. Then, in step S302, the content providing server 10 sends back a content list containing metadata that can be provided by the content providing server 10.

In step S303, the camera 40 establishes connection to the communication network 60, and transmits an Alive message to the communication network 60 through an SSDP Advertise. Then, the content providing server 10 acquires a description of the camera 40, and acquires information on services provided by the camera 40.

In step S304, in the case where the camera 40 provides a ContentDirectory service, contents managed by the content providing server 10 are uploaded into the camera 40. After the upload, the content providing server 10 transmits a SOAP ACTION Browse_Request message to the camera 40, in order to acquire information on the uploaded contents (S305).

In step S306, the camera 40 that has received the Browse_Request message sends back a content list containing metadata that can be provided by the camera 40. That is to say, the content providing server 10 performs download.

In step S307, the content providing server 10 that has received the content list compares the received metadata and metadata that can be provided by the content providing server 10. Through this comparison, metadata that cannot be provided by the content providing server 10 but can be provided by the camera 40 can be acquired. Then, the acquired metadata is stored.

In step S308, the content providing server 10 receives the Browse_Request message from the TV 20. Then, in step S309, a content list containing not only metadata that can be provided by the content providing server 10 but also metadata that can be provided by the camera 40 is sent back.

As described above, with the information processing apparatus according to the first embodiment, more of the contents managed by the content providing server 10 can be provided to a client (the TV 20). Furthermore, content list information can be dynamically generated and provided, according to a status of an external processing apparatus that is connected to a communication network when an acquisition request for a content list is received.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-063236, filed Mar. 16, 2009 which is hereby incorporated by reference herein in its entirety.

What is claimed is:

1. An information processing apparatus connected to a communication network, comprising:

a managing unit that manages a content and attribute information of the content;

a detecting unit that detects an external processing apparatus connected to the communication network;

an acquiring unit that acquires capability information, which indicates a capability that can be provided by the external processing apparatus detected by the detecting unit;

a generating unit that generates content list information containing a first list indicating a content that is managed by the managing unit and that can be provided by the information processing apparatus without help of the capability of the external processing apparatus, and a second list indicating a content that is managed by the managing unit and that can be provided by the information processing apparatus with help of the capability of the external processing apparatus; and a providing unit that provides the content list information to a client apparatus connected to the communication network.

2. The information processing apparatus according to claim 1, further comprising:

a receiving unit that receives an acquisition request for a content contained in the content list information, from the client apparatus; and a content-providing unit that, in the case where the content on which the acquisition request has been received by the receiving unit is a content contained in the first list, provides the content to the client apparatus, and that, in the case where the content on which the acquisition request has been received by the receiving unit is a content contained in the second list, provides the content to the client apparatus by giving a request to process the content to the external processing apparatus.

3. The information processing apparatus according to claim 1, wherein the capability information includes information on at least one of a content conversion processing capability and a content distribution processing capability.

4. The information processing apparatus according to claim 3, wherein the acquiring unit acquires information on the conversion processing capability by uploading a content into the external processing apparatus, and downloading a content corresponding to the uploaded content from the external processing apparatus.

5. The information processing apparatus according to claim 3, wherein the conversion processing capability includes at least one of capabilities relating to a content format conversion processing, a size conversion processing, and a resolution conversion processing.

6. The information processing apparatus according to claim 3, wherein the distribution processing capability includes a capability of a protocol that can be used to distribute a content.

7. The information processing apparatus according to claim 1, wherein the detecting unit detects that the external processing apparatus has left the communication network, and, in the case where it is detected that the external processing apparatus has left, the generating unit deletes the second list from the content list information.

8. A method for controlling an information processing apparatus connected to a communication network, comprising:

a managing step of managing a content stored in a storage unit and attribute information of the content;

a detecting step of detecting an external processing apparatus connected to the communication network;

an acquiring step of acquiring capability information, which indicates a capability that can be provided by the external processing apparatus detected in the detecting step;

a generating step of generating content list information containing a first list indicating a content that is managed in the managing step and that can be provided by the information processing apparatus without help of the capability of the external processing apparatus, and a second list indicating a content that is managed in the managing step and that can be provided by the information processing apparatus with help of the capability of the external processing apparatus; and a providing step of providing the content list information to a client apparatus connected to the communication network.

9. A computer-readable storage medium storing a computer program for causing a computer to function as the units of the information processing apparatus according to claim 1.

* * * * *